March 14, 1950     B. C. MELVIN     2,500,259
LOAD BINDER
Filed June 10, 1948
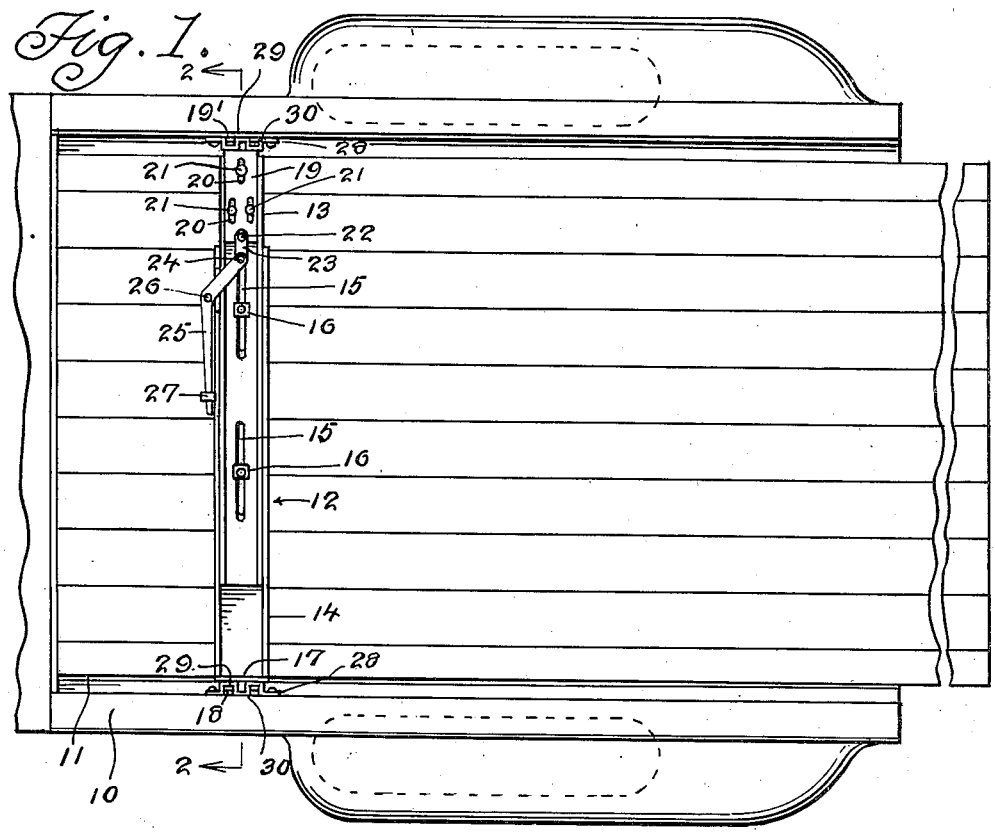
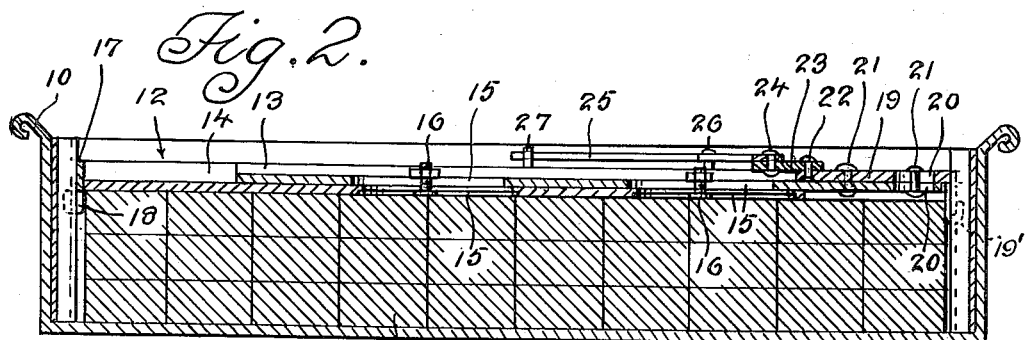
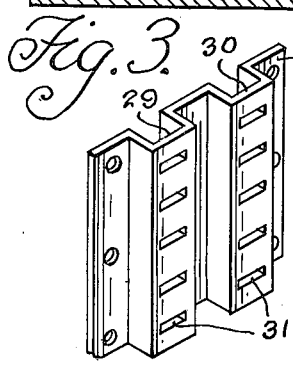
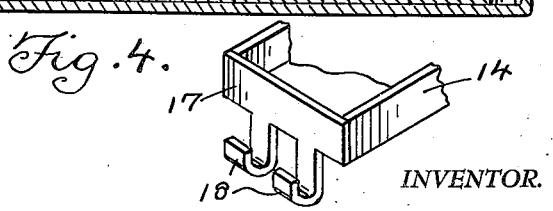
INVENTOR.
Byron C. Melvin
BY Victor J. Evans &Co.
ATTORNEYS Patented Mar. 14, 1950

2,500,259

UNITED STATES PATENT OFFICE 2,500,259

LOAD BINDER

Byron C. Melvin, Renton, Wash.

Application June 10, 1948, Serial No. 32,211

1 Claim. (Cl. 280—179)

This invention relates to a load balancer for motor vehicle trucks, and the primary object of the invention is to provide a device which, engaging the opposite sides of a truck body, will retain an overbalanced load in the truck body.

An object of the invention is to provide two channel shaped members which are coactively engaged with each other, so that their length can be varied to engage the sides of a truck body, and again shortened to be removed from engagement with the sides of the truck body.

With the above and other objects in view, the invention consists of the novel details of construction, arrangement and combination of parts more fully hereinafter described, claimed and illustrated in the accompanying drawing in which:

Figure 1 is a partial plan view of a truck body with an embodiment of the invention in operational engagement therewith;

Figure 2 is a sectional view on the line 2—2 of Figure 1;

Figure 3 is a perspective view of an anchor plate and Figure 4 is a fragmentary perspective view of the attaching end of the device.

Referring more in detail to the drawing, the numeral 10 is used to designate the partial representation of a truck body and 11 the load carried therein.

The load balanced 12 embodying the invention comprises two channel shaped members 13 and 14 which are telescopically arranged with each other. Each member is provided with relatively spaced elongated slots 15 and a bolt 16 passing through the alined slots retains the members in sliding relation to each other. Secured to the outer end of the member 14, is a plate 17 which is provided with depending, relatively spaced hooks 18.

Slidably mounted on the outer end of the member 13, is the lock plate 19, and the movement of this plate in relation to the member 13 is accomplished by the elongated slots 20 in the member 13 and the plate 19. Bolts 21 passing through these slots retain the plates in fixed engagement with the member 13 as desired. The plate 19, at its outer end, is also provided with relatively spaced hooks 19' which are similar to the hooks 18 on the member 14.

Pivoted at 22 to the upper edge of the plate 19, is a link 23 which at 24, is pivoted to the bell crank lever 25. The lever 25 is pivoted at 26 at its angle to the member 14 and a catch 27 on the member 14 engages the lever to retain it in locked position.

Permanently fixed to the opposite inner sides of the truck body 10 is the anchor plate 28, which is formed with channels 29 and 30 respectively. The face of each channel is provided with transverse, relatively spaced slots 31, which are adapted to be engaged by the hooks 18 of the members 13 and 14.

In operation, the device is used to permit the truck owner to carry a load which, due to its length and the length of the truck body, would be normally overbalanced, so that it could not be safely carried in the truck body.

The plates 28 are fixed to the inner faces of the sides of the body adjacent the outer longitudinal edges of the sides. The load is placed in the truck body and supported in horizontal position. The load balancer 12 is then placed on the load 11, and the hooks 18 on the outer ends of the telescopic member 14 are engaged in the slots 31 in the channel portions of the plate 28. At the same time, the hooks 19' are engaged in the slots 31 in the opposite plate 28. If the plate 19 has not already been adjusted and fixed by bolts 21, the bolts are then tightened and the lever 25 is moved to draw the members 13 and 14 into locked position.

The bolts 16 are then tightened to securely bind the members in fixed relation to each other.

The hooks 18 and 19', pulling upward on the slots 31, will not be easily disengaged, should the bolts 16 become loosened during the travel of the truck.

There has thus been provided, a simple, easily installed, inexpensive device which will accomplish the objects of the invention.

It is believed that from the foregoing description, structure and use of the device will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A load binder or balancer of the type described, comprising oppositely arranged, slotted anchor plates secured to the inner surfaces of the sides of a truck body, a pair of telescopically arranged, channel-shaped members, a plate slidably mounted on one of said members, hooks on the outer end of the other of said members and hooks on the outer end of said plate, a bell crank lever pivotally connected to said plate at one end and at its angle to the channel shaped member on which said plate is mounted and said bell crank lever is adapted for extending or retracting the plate with relation to the member on which it is mounted, the hooks of said member and said plate adapted to be selectively positioned in the slots in said anchor plate, and the members and plate adapted to be tightened by the movement of said lever.

BYRON C. MELVIN.

REFERENCES CITED

The following references are of record in the file of this patent:

UNITED STATES PATENTS

| Number | Name | Date |
|---|---|---|
| 710,639 | Vickers | Oct. 7, 1902 |
| 1,751,717 | Romine | Mar. 25, 1930 |

FOREIGN PATENTS

| Number | Country | Date |
|---|---|---|
| 361,232 | Germany | Oct. 12, 1922 |